US012722474B2

(12) United States Patent
Krug et al.

(10) Patent No.: US 12,722,474 B2
(45) Date of Patent: Sep. 1, 2026

(54) COOLANT CIRCUIT FOR A SELF-PROPELLED WORKING MACHINE COMPRISING MULTIPLE ELECTRIC DRIVE COMPONENTS

(71) Applicant: MANITOWOC CRANE GROUP FRANCE SAS, Dardilly (FR)

(72) Inventors: Andreas Krug, Oldenburg (DE); John F. Benton, Wilhelmshaven (DE)

(73) Assignee: Manitowoc Crane Group France SAS, Dardilly (FR)

( * ) Notice: Subject to any disclaimer, the term of this patent is extended or adjusted under 35 U.S.C. 154(b) by 86 days.

(21) Appl. No.: 18/492,773

(22) Filed: Oct. 23, 2023

(65) Prior Publication Data

US 2024/0131918 A1 Apr. 25, 2024
US 2024/0227540 A9 Jul. 11, 2024

(30) Foreign Application Priority Data

Oct. 21, 2022 (DE) ......................... 102022127839.5

(51) Int. Cl.
*B60K 11/02* (2006.01)
*B60H 1/14* (2006.01)
(Continued)

(52) U.S. Cl.
CPC ................ *B60K 11/02* (2013.01); *B60H 1/14* (2013.01); *B60H 1/143* (2013.01); *B60K 11/04* (2013.01);
(Continued)

(58) Field of Classification Search
CPC ......... B60K 11/02; B60K 11/04; B60K 11/06; B60Y 2200/416; B60Y 2306/05; F01P 1/06; F01P 3/12; F01P 3/20; F01P 2003/2292; B60H 1/14; B60H 1/143
USPC ........................................................... 165/41
See application file for complete search history.

(56) References Cited

U.S. PATENT DOCUMENTS

| | | |
|---|---|---|
| 2011/0000241 A1 | 1/2011 | Favaretto |
| 2021/0088124 A1 | 3/2021 | Remboski et al. |

(Continued)

FOREIGN PATENT DOCUMENTS

| | | |
|---|---|---|
| DE | 102015007235 A1 | 12/2015 |
| DE | 102020102885 A1 | 6/2021 |

(Continued)

OTHER PUBLICATIONS

Office Action dated Jul. 16, 2024, issued in connection with corresponding JP Pat. Appl. No. 2023-180776.

(Continued)

*Primary Examiner* — Joel M Attey
(74) *Attorney, Agent, or Firm* — Cook Alex Ltd.

(57) ABSTRACT

A coolant circuit for a self-propelled work machine includes multiple electric drive components, including a coolant pump for generating a flow of coolant which circulates in the coolant circuit, a heat exchanger for dissipating thermal energy stored in the coolant, and at least two circuit lines which extend parallel to each other and are embodied to guide the coolant past the drive components respectively assigned to them, in order to absorb thermal energy. A self-propelled work machine, in particular a mobile crane, includes multiple electric drive components and one or more such coolant circuits.

6 Claims, 2 Drawing Sheets

(51) Int. Cl.

| | |
|---|---|
| *B60K 11/04* | (2006.01) |
| *B60K 11/06* | (2006.01) |
| *F01P 1/06* | (2006.01) |
| *F01P 3/12* | (2006.01) |
| *F01P 3/20* | (2006.01) |
| *F01P 3/22* | (2006.01) |

(52) U.S. Cl.

CPC ......... *B60K 11/06* (2013.01); *B60Y 2200/416* (2013.01); *B60Y 2306/05* (2013.01); *B60Y 2410/104* (2013.01); *F01P 1/06* (2013.01); *F01P 3/12* (2013.01); *F01P 3/20* (2013.01); *F01P 2003/2292* (2013.01)

(56) References Cited

U.S. PATENT DOCUMENTS

| | | | | |
|---|---|---|---|---|
| 2022/0145587 | A1 | 5/2022 | Takeo et al. | |
| 2024/0008221 | A1* | 1/2024 | Quix ................. | H01M 8/04067 |

FOREIGN PATENT DOCUMENTS

| | | | |
|---|---|---|---|
| DE | 102021200734 | A1 | 7/2022 |
| EP | 3377354 | B1 | 4/2020 |
| JP | 2015-197029 | A | 11/2015 |
| JP | 2020-153115 | A | 9/2020 |
| JP | 2022-157891 | A | 10/2022 |
| JP | 2022-157912 | A | 10/2022 |
| WO | 2016006174 | A1 | 1/2016 |
| WO | 2022-210391 | A | 10/2022 |

OTHER PUBLICATIONS

European Search Report and Written Opinion issued by the EPO in connection with corresponding EP Pat. Appl. 23 19 6125, dated Apr. 12, 2024, and machine translation thereof.

Office Action issued by the German Patent Office (DPMA) in connection with corresponding German application DE 10 2022 127 839.5, dated Aug. 3, 2023, and machine translation thereof.

* cited by examiner

COOLANT CIRCUIT FOR A SELF-PROPELLED WORKING MACHINE COMPRISING MULTIPLE ELECTRIC DRIVE COMPONENTS

The following invention relates to a coolant circuit, by means of which the thermal output generated by electric drive components of a self-propelled drive machine, in particular a mobile crane, is dissipated and the electric drive components are thus cooled. The present invention also relates to a self-propelled work machine, in particular a mobile crane, comprising one or more such coolant circuits.

In known work machines, including mobile cranes, it is usual to operate the individual (crane) functions by means of so-called hydraulic drives in which one or more hydraulic pumps, to which for example a mechanical (shaft) output is supplied, are fluidically connected to hydraulic cylinders or hydraulic motors of the individual (crane) functions, in order to ultimately drive them. In hybrid-electric or all-electric drive designs, these hydraulic drives are at least partially supplemented by or replaced with electric drives. Electric drives usually comprise electric motors including associated inverters for output and position control. The electric power required is provided by a generator, which is driven for example by an internal combustion engine in the undercarriage of the work machine, or by inputting external electric power. Equally, the machine can be provided with an energy storage of its own for supplying power, wherein a combination of said supplying options is also conceivable. Decelerating individual drives releases energy which can in turn be used to charge the energy storage. If the energy storage is fully charged, this power often has to be depleted via an electrical resistor, a so-called brake chopper, whereby thermal energy is released. Energy storages and/or accumulators, electric motors and associated inverters, together with their power electronics and controllers, place high demands on keeping to permissible operating temperatures. If the operating temperatures exceed or drop below so-called operating temperature limits, the output of the relevant components is reduced in order to protect the system. In order to avoid these reductions in output, which are disadvantageous for machine operations, such electric drive components are cooled by means of often elaborate mechanisms. Liquid cooling systems, i.e. cooling systems which use a liquid cooling medium (in most cases, water-glycol mixtures) are widely used for this purpose. For the sake of simplicity, reference is made below to a mobile crane as a specific embodiment of a self-propelled work machine. The designs described below can of course be applied to any type of self-propelled machine and are therefore not limited to a mobile crane.

The drive components of the individual crane functions which are usually to be found in cranes include hydraulic pumps which drive hydraulic motors or hydraulic cylinders assigned to them, in order for example to actuate luffing mechanisms, lifting mechanisms, telescoping mechanisms and slewing mechanisms.

The object of the present invention is to provide a cooling system which efficiently addresses the cooling capacity requirements of different electric drive components in all-electric or hybrid-electric drive designs. The present invention has recognised that it is not usually the case during mobile crane operations that all the drives are simultaneously running at a high load factor, with the associated cooling capacity requirements. An intelligent cooling system design thus affords significant potential savings.

In accordance with the present invention, a coolant circuit for a self-propelled work machine comprising multiple electric drive components is proposed, wherein the coolant circuit comprises:

- a coolant pump for generating a flow of coolant which circulates in the coolant circuit;
- a heat exchanger for dissipating thermal energy stored in the coolant;
- at least two circuit lines which extend parallel to each other and are embodied to guide the coolant past the drive components respectively assigned to them, in order to absorb thermal energy.

In other words, at least a partial region of the coolant circuit in accordance with the invention comprises multiple lines which extend parallel to each other for cooling the drive components respectively assigned to them, wherein these lines can be fed via a common feed flow and can emerge again into a common return flow. The coolant pump can also be arranged in the feed flow, wherein the heat exchanger/cooler can be arranged in the return flow.

By providing at least two circuit lines which are arranged parallel to each other, it is possible in accordance with the present invention to divide the individual drive components between the lines provided, according to their cooling capacity requirements. It is then possible to divide the individual drive components between the available circuit lines according to their thermal input, such that the thermal input is as uniform as possible throughout the coolant circuit. Locally excessive thermal input is thus avoided.

In one embodiment, the circuit lines can cause a substantially equal pressure loss in the coolant flow throughout their extent, wherein in particular at least one of the circuit lines comprises a throttling element, by means of which the pressure loss of the relevant circuit line is adjusted to the pressure loss of the at least one other circuit line.

In other words, a substantially equal backpressure is generated in each circuit line. This is enabled by selecting the drive components arranged in the respective circuit lines in a targeted way. This means that the volume flows of coolant which are guided through the respective circuit lines are in a fixed ratio throughout the crane operations, but can perfectly well exhibit different magnitudes from each other. Even if adeptly combining and arranging the drive components to be provided for the respective crane does not enable sufficiently similar backpressures and/or pressure losses to be generated in the individual circuit lines, throttling elements such as throttles, baffles or throttling valves can be used in individual circuit lines to generate pressure losses and/or backpressures which are satisfactorily equal throughout the circuit lines.

In accordance with another example, the drive components in at least one of the circuit lines can be arranged according to the level of their respective operating temperature limit, starting in the flow direction of the coolant with the lowest operating temperature limit.

In other words, efficiency is further increased by channeling the coolant flow first past the drive components with the lowest operating temperature limit, i.e. those which are first likely to require a reduction in output because their operating temperature is too high, in at least one of the circuit lines. If there are more than three drive components in one circuit line, they can thus be arranged as follows: the coolant being guided through the circuit line first reaches the drive component with the lowest operating temperature limit, then the drive component with a medium operating temperature limit and lastly the drive component with the highest operating temperature limit. By arranging the drive components in this way, the available coolant flow can be used efficiently and the coolant circuit, including the coolant pump and the pipework, can consequently be dimensioned to be smaller.

The drive components within a circuit line can also be arranged according to their thermal dissipation and/or their relevance to safety. Specifically, this could mean that the coolant passes the component most relevant to safety first, followed by components less relevant to safety. Components which exhibit the lowest thermal dissipation could also be passed first, followed by components with a higher thermal dissipation. It is also conceivable for the components within a circuit line to be arranged on the basis of at least two of the following criteria: operating temperature limit, thermal dissipation and relevance to safety.

The circuit lines can be arranged between the coolant pump and the heat exchanger, as viewed in the flow direction of the coolant. The coolant pump can for example be arranged in the feed flow upstream of the individual circuit lines, and the heat exchanger and/or cooler can for example be arranged in the return flow downstream of the individual circuit lines. It would of course also be conceivable to arrange the heat exchanger in the feed flow and/or to arrange the coolant pump in the return flow.

In accordance with another embodiment of the present invention, the coolant circuit comprises at least one connecting line which fluidically connects at least two of the circuit lines and comprises at least one valve for opening and/or closing the connecting line and/or varying the volume flow of the coolant being guided through the connecting line. Such a connecting line enables coolant to be transferred from one circuit line to another circuit line which extends parallel to it, in order to feed coolant to drive components which is lower or higher in temperature than would be possible via their “own” circuit line. Such “cross-supplying” can be selectively provided whenever an operating temperature of the drive component(s) to be cooled which is too low or too high is determined or, as applicable, expected. The connecting line can be opened and closed by one or more valves which can be selectively switched. It is also conceivable for all or only some of the coolant flow to be drawn from the contributing circuit line. It is also conceivable for the actual coolant feed via the feed flow to be completely or only partially closed in the receiving circuit line.

In one embodiment, the connecting line connects a first circuit line downstream of at least one drive component in the first circuit line in the flow direction of the coolant to a second circuit line upstream of at least one drive component in the second circuit line in the flow direction of the coolant. Such an arrangement enables the waste heat from individual drive components, which has been transferred to the coolant in the first circuit line, to be used to heat one or more drive components in the second circuit line. This is useful in particular when drive components for crane operations have to reach an operating temperature first, in order to avoid reductions in output. This is in particular conceivable in connection with storage batteries and/or accumulators, wherein any conceivable drive components already provided for the crane functions can be used as a heat source, although it is equally possible to provide heating devices, in particular electrically operated heating devices.

While it is conceivable for the function of the at least one connecting line for the at least one valve to be actuated manually, for example by crane personnel, the at least one valve can however be embodied such that it can be activated, in particular by means of a control device, in order to automatically guide a volume flow of coolant via the connecting line, according to the coolant requirements of a drive component which is supplied with coolant via the connecting line.

In another embodiment, the control device can comprise at least one sensor, which detects the temperature of a drive component, and can selectively cause the at least one valve to open or close when the drive component drops below or exceeds a temperature threshold which is predefined for the drive component.

If it is thus determined that it is necessary or even merely advantageous for operations for a drive component to be heated, the connecting line can be opened by means of the (preferably electronic) control device, in order to use the waste heat from one drive component to heat another drive component. Once the necessary operating temperature has been reached, the control device can cause the connecting line to close again. This applies similarly if drive components have additional cooling requirements which can be covered via the connecting line.

Another aspect of the present invention relates to a self-propelled work machine, in particular a mobile crane, comprising multiple electric drive components and a coolant circuit in accordance with one of the embodiments described above.

In another embodiment, the self-propelled work machine (in particular, the mobile crane) can comprise multiple such coolant circuits, which can be embodied identically, similarly or differently to each other. For a work machine and/or crane comprising an undercarriage and a superstructure which is rotatably arranged on the undercarriage, it would first be conceivable to provide one coolant circuit which for example extends through the rotary union between the superstructure and the undercarriage. Conversely, it is conceivable for the undercarriage and the superstructure to be respectively provided with their own, mutually independent coolant circuits.

The present invention is explained in more detail below on the basis of preferred embodiments and with reference to the attached figures. The invention can include any of the features described here, individually and in any expedient combination.

Figure 1:
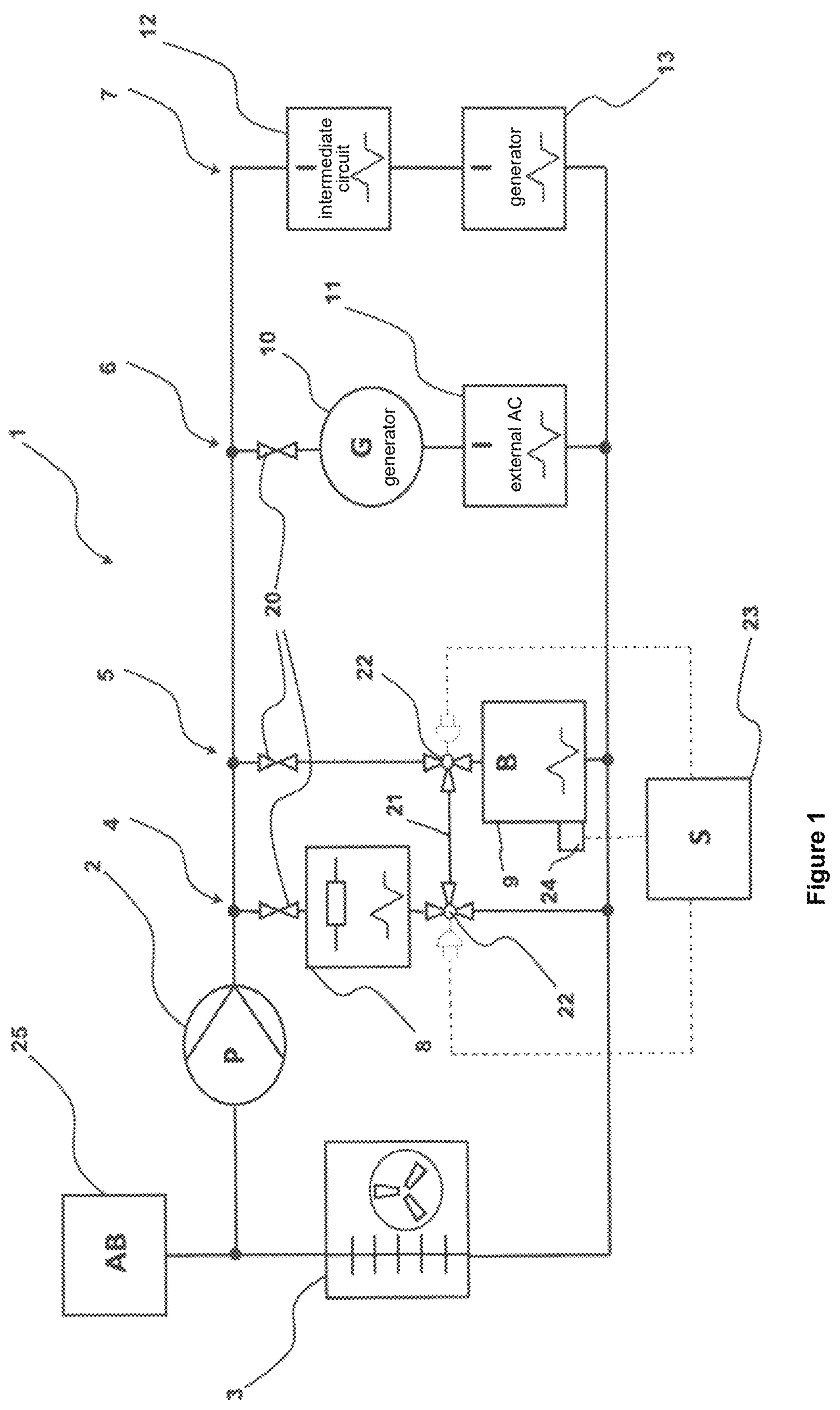
FIG. 1 shows a coolant circuit for a crane undercarriage.

FIG. 1 shows a coolant circuit 1 for a crane undercarriage which, in addition to a feed flow comprising the coolant pump 2 and a return flow comprising the heat exchanger 3, comprises four circuit lines 4 to 7 which extend parallel to each other between the feed flow and the return flow. The coolant delivered by the pump 2 is fed to all of the circuit lines 4 to 7, in order to cool (in other words, dissipate the waste heat of) the electric drive components 8 to 13 arranged in the respective circuit lines 4 to 7. Via a common return flow, the heated coolant is fed to the heat exchanger 3 in which the stored thermal energy is removed from the coolant again. An expansion tank 25 arranged between the heat exchanger 3 and the pump 2 in the direction of flow of the coolant is used to compensate for thermally induced changes in the volume of the coolant.

In the example shown in FIG. 1, all of the circuit lines 4 to 7 exhibit an approximately equal pressure loss and/or generate an approximately equal backpressure. This means that the volume flows of coolant being guided through the respective circuit lines 4 to 7 are in a fixed size ratio, without individual circuit lines 4 to 7 being oversupplied or undersupplied. Since the circuit line 7 comprising the inverter 12 for an intermediate circuit of the electrical energy supply and the inverter 13 of the generator 10 exhibits the greatest pressure loss, the other circuit lines 4 to 6 (in which the assigned drive components 8 to 11 cause a smaller pressure loss) are provided with throttling valves 20, such that all of the circuit lines 4 to 7 exhibit an approximately equal pressure loss and/or generate an approximately equal back-pressure.

Within the individual circuit lines 4 to 7, the drive components 8 to 13 are arranged such that the coolant flow first passes the drive components with the lowest operating temperature limit and only then the subsequent drive components with a higher operating temperature limit.

The coolant circuit 1 shown in FIG. 1 also comprises an electronic control device 23 which is connected for signal transmission to two valves 22 and a temperature sensor 24 and causes the valves 22 to open and/or close according to a temperature value transmitted by the sensor 24. What this specifically means in the example shown is that if the sensor 24 detects a temperature of the accumulator and/or storage battery 9 which is too low, the control device 23 causes the connecting line 21 to open, such that the waste heat discharged to the coolant by the brake chopper 8 is fed to the storage battery 9 via the connecting line 21, in order for it to reach its operating temperature. When the valves 22 are in this state, there is no direct connection between the circuit line 4 and the return flow and no direct connection between the circuit line 5 and the feed flow. All of the coolant guided past the brake chopper 8 is consequently also guided past the storage battery 9.

The brake chopper 8 converts excess energy, which for example arises from recuperation by braking a drive and cannot be used to charge the storage battery 9 because the storage battery 9 is sufficiently charged, into thermal energy via an electrical resistor, wherein said thermal energy is absorbed by the passing coolant.

Since it is not to be expected that a high thermal output from both the generator 10 and the inverter of the external power supply 11 will have to be dissipated simultaneously, these components can be arranged in the same line 6.

Figure 2:
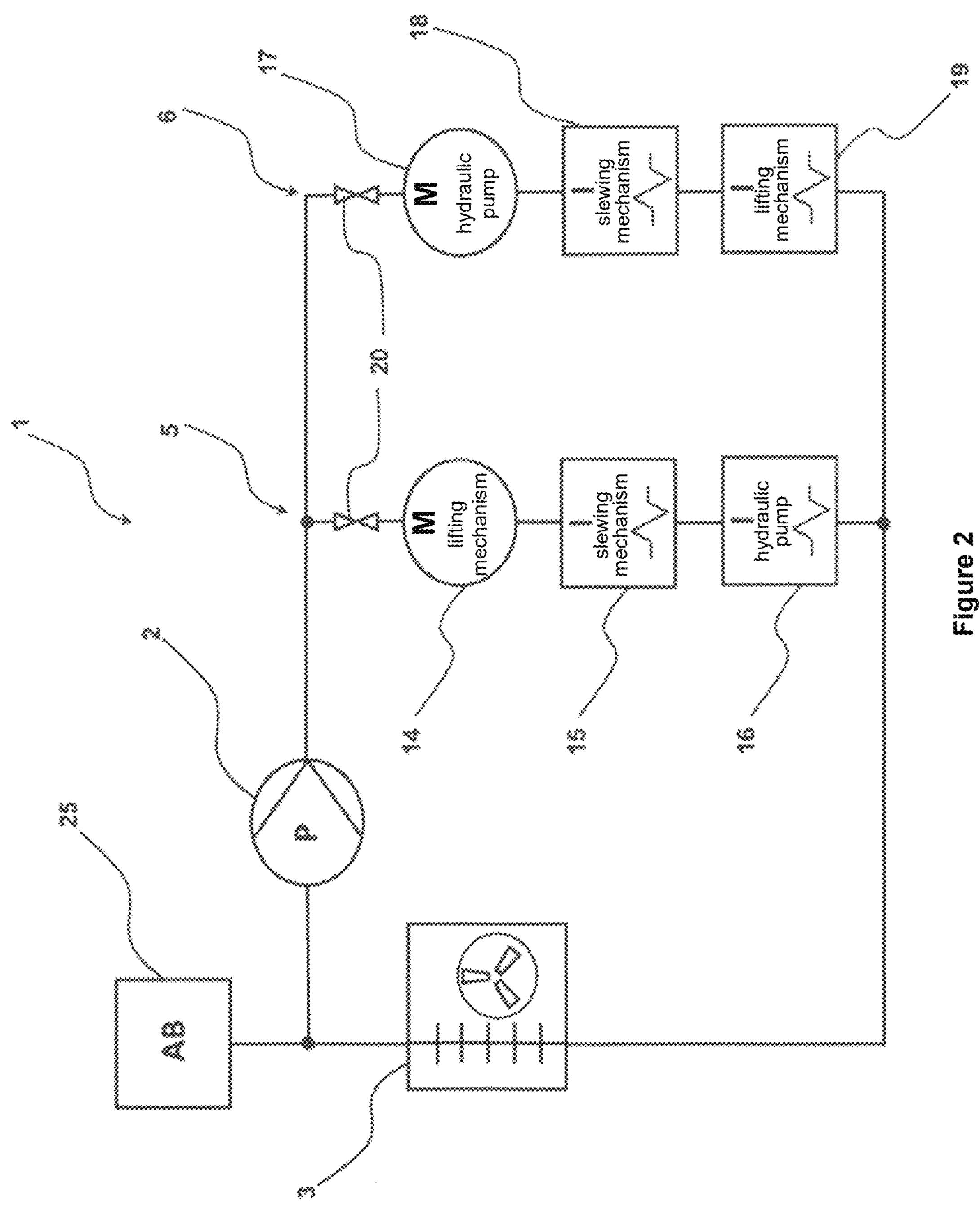
FIG. 2 shows a coolant circuit for a crane superstructure.

FIG. 2 shows a coolant circuit 1 for a crane superstructure, the essential components of which are identical to those of the coolant circuit 1 shown in FIG. 1. The coolant circuit 1 provided for the crane superstructure, however, comprises only two parallel circuit lines 5 and 6 which each supply three drive components 14 to 16 and 17 to 19, respectively, with coolant. In the line 5, these are (in order of increasing permissible operating temperature limit): the electric motor 14 of the lifting mechanism; the inverter 15 of a first air-cooled slewing mechanism motor; and the inverter 16 for the hydraulic pump 17. In the line 6, these are: the water-cooled electric motor for the hydraulic pump, which for example supplies the luffing mechanism and the telescoping mechanism with hydraulic liquid; another inverter 18 for a second air-cooled slewing mechanism motor; and the inverter 19 for the water-cooled lifting mechanism motor 14. Since it may be assumed of the underlying mobile crane that the lifting mechanism will not be permanently operated together with the luffing mechanism or telescoping mechanism (such that their drive components would be simultaneously generating a high level of waste heat), their corresponding drive components 14, 16, 17 and 19 are supplied with coolant via the same circuit lines 5 and 6. In order to avoid local "heat spikes", the individual components 14, 16, 17 and 19 of the lifting mechanism and hydraulic pump are distributed "crosswise" between the circulation lines 5 and 6.

The invention claimed is:

1. A coolant circuit for a self-propelled work machine comprising multiple electric drive components, comprising:

a coolant pump for generating a flow of coolant which circulates in the coolant circuit;

a heat exchanger for dissipating thermal energy stored in the coolant;

at least two circuit lines which extend parallel to each other and are embodied to guide the coolant past the drive components respectively assigned to them, in order to absorb thermal energy;

at least one connecting line which fluidically connects at least two of the at least two circuit lines and which is adapted to draw part of the coolant from a first of the at least two circuit lines and feed said coolant to a second of the at least two circuit lines, wherein the at least one connecting line comprises at least one valve for opening and/or closing the connecting line and/or varying a volume flow of the coolant being guided through the connecting line;

a sensor which detects a temperature of a drive component in the second of the at least two circuit lines; and a control device that activates the at least one valve to guide the volume flow of coolant via the connecting line when a detected temperature of the drive component in the second of the at least two circuit lines is below a predefined temperature threshold, such that heat discharged to the coolant by a drive component in the first of the at least two circuit lines is fed to the drive component in the second of the at least two circuit lines to increase the temperature of the drive component in the second of the at least two circuit lines.

2. The coolant circuit according to claim 1, wherein at least one of the at least two circuit lines includes multiple drive components, wherein the drive components in the at least one circuit line are arranged according to a level of their respective operating temperature limit or thermal dissipation rate, starting in the flow direction of the coolant within the at least one circuit line with the lowest operating temperature limit or lowest thermal dissipation rate.

3. The coolant circuit according to claim 1, wherein the at least two circuit lines are arranged between the coolant pump and the heat exchanger in the flow direction of the coolant.

4. The coolant circuit according to claim 1, wherein the connecting line connects a first circuit line downstream of at least one drive component in the first circuit line in the flow direction of the coolant to a second circuit line upstream of at least one drive component in the second circuit line in the flow direction of the coolant.

5. A self-propelled work machine, comprising multiple electric drive components and a coolant circuit comprising:

a coolant pump for generating a flow of coolant which circulates in the coolant circuit;

a heat exchanger for dissipating thermal energy stored in the coolant; and at least two circuit lines which extend parallel to each other and are embodied to guide the coolant past the drive components respectively assigned to them, in order to absorb thermal energy;

at least one connecting line which fluidically connects at least two of the at least two circuit lines and which is adapted to draw part of the coolant from a first of the at least two circuit lines and feed said coolant to a second of the at least two circuit lines, wherein the at least one connecting line comprises at least one valve for opening and/or closing the connecting line and/or varying a volume flow of the coolant being guided through the connecting line;

a sensor which detects a temperature of a drive component in the second of the at least two circuit lines; and a control device that activates the at least one valve to guide the volume flow of coolant via the connecting line when a detected temperature of the drive component in the second of the at least two circuit lines is below a predefined temperature threshold, such that heat discharged to the coolant by a drive component in the first of the at least two circuit lines is fed to the drive component in the second of the at least two circuit lines to increase the temperature of the drive component in the second of the at least two circuit lines.

6. The self-propelled work machine according to claim 5, comprising multiple coolant circuits which are embodied, independently of each other, wherein a first coolant circuit of the multiple coolant circuits is assigned to the undercarriage of the work machine comprising multiple drive components, and a second coolant circuit of the multiple coolant circuits is assigned to the superstructure of the work machine comprising multiple drive components.

* * * * *